Figure 1:
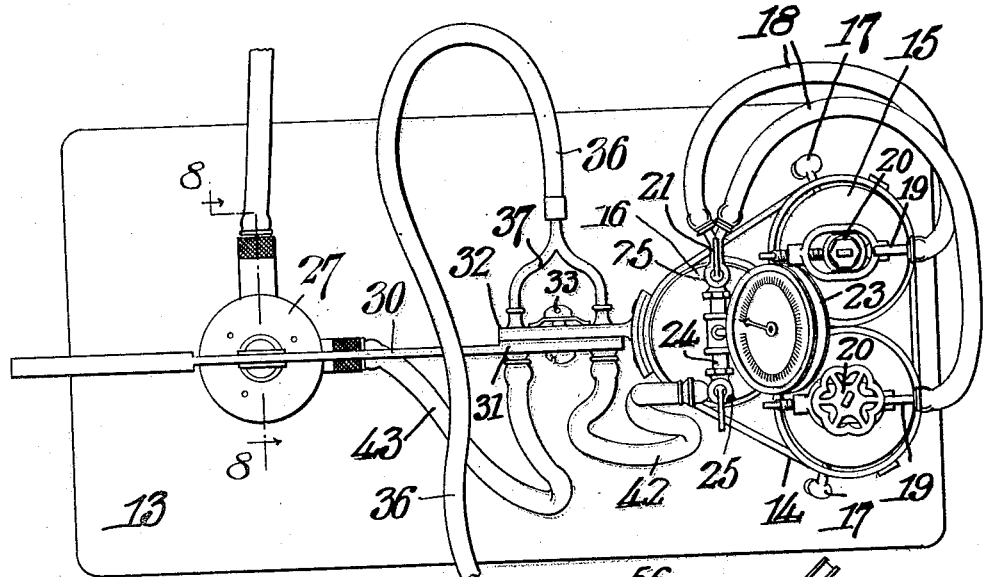

T. H. PHILLIPS.
ARTIFICIAL BREATHING APPARATUS.
APPLICATION FILED AUG. 10, 1915.

1,201,092.

Patented Oct. 10, 1916.
4 SHEETS—SHEET 1.

Witnesses
Jno. P. Woodworth
S. E. Davis

Inventor
Thomas H. Phillips
By Dwight B. Galt
Attorney

T. H. PHILLIPS.
ARTIFICIAL BREATHING APPARATUS.
APPLICATION FILED AUG. 10, 1915.

1,201,092.

Patented Oct. 10, 1916.
4 SHEETS—SHEET 2.

Witnesses
Jno. P. Woodworth
A. E. Davis

Inventor
Thomas H. Phillips.
By Dwight B. Galt
Attorney

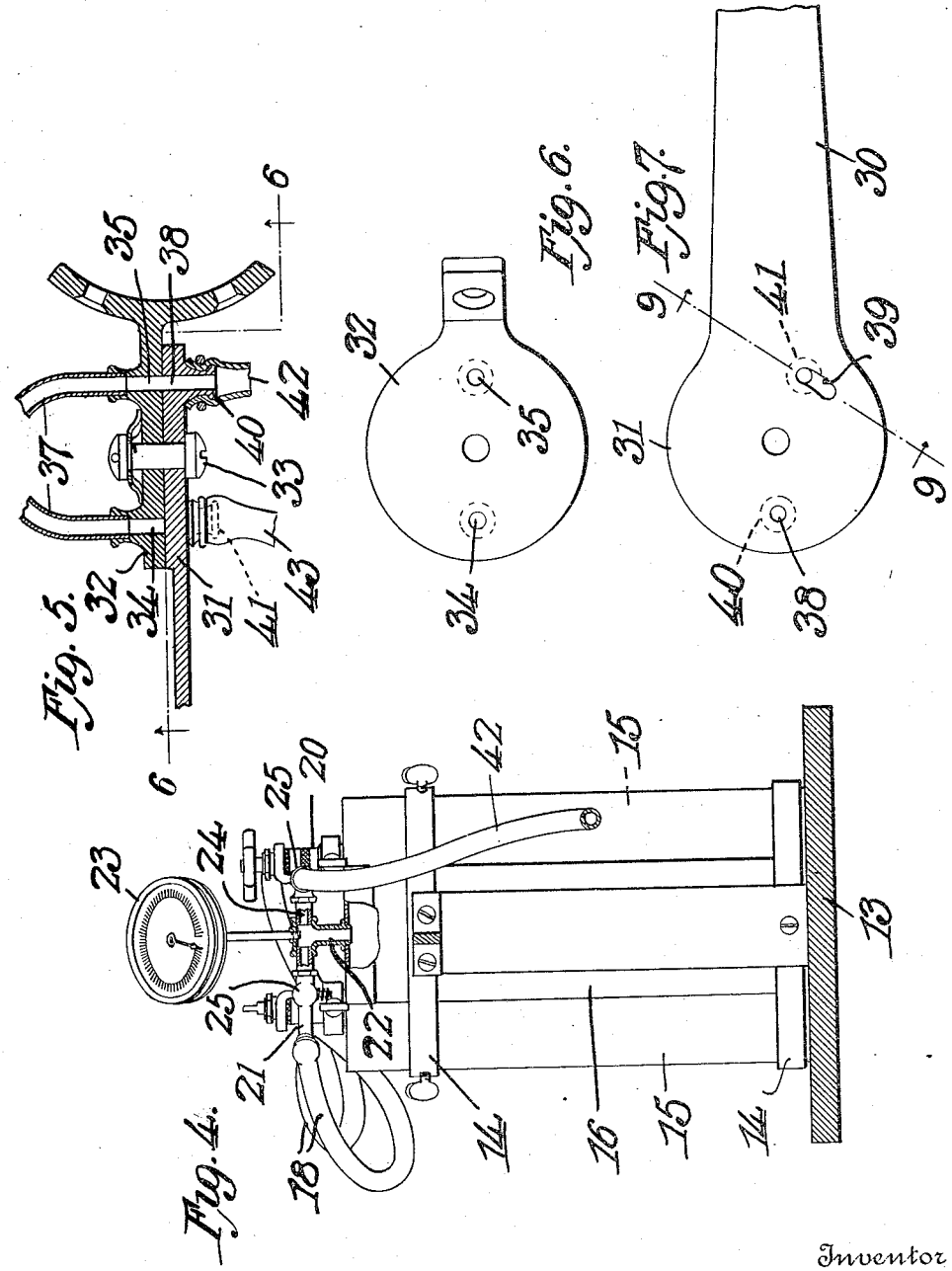

T. H. PHILLIPS.
ARTIFICIAL BREATHING APPARATUS.
APPLICATION FILED AUG. 10, 1915.
1,201,092.
Patented Oct. 10, 1916.
4 SHEETS—SHEET 4.
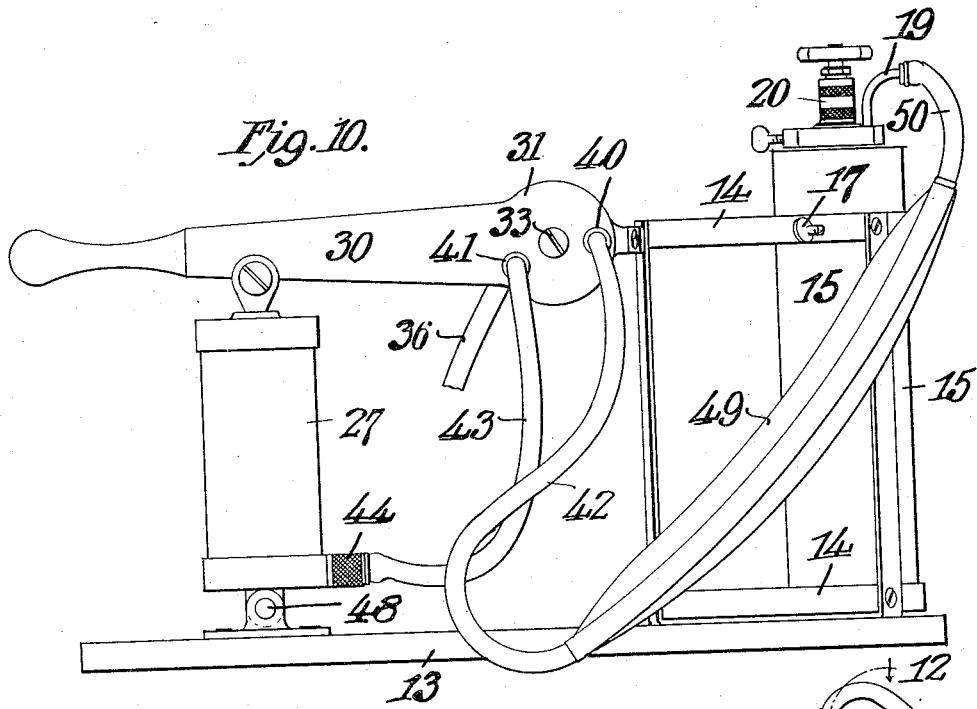
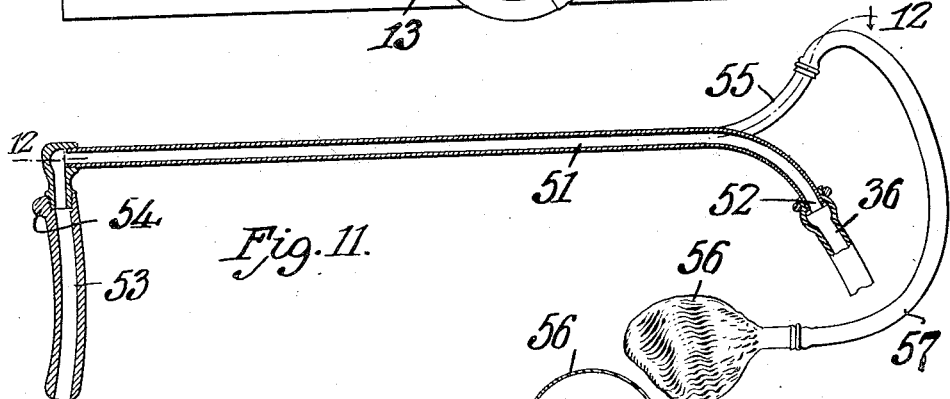
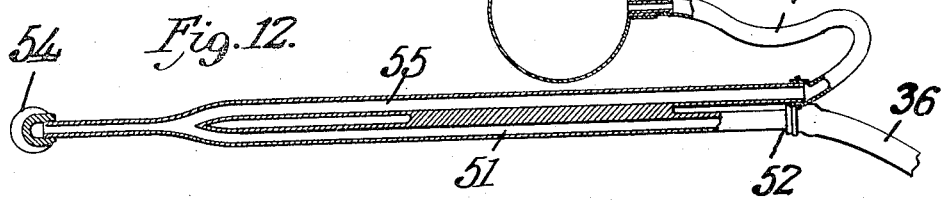
Witnesses
Inventor
Thomas H. Phillips.
By Dwight B. Galt
Attorney

UNITED STATES PATENT OFFICE.

THOMAS H. PHILLIPS, OF BALTIMORE, MARYLAND.

ARTIFICIAL-BREATHING APPARATUS.

1,201,092.  Specification of Letters Patent.  Patented Oct. 10, 1916.

Application filed August 10, 1915. Serial No. 44,690.

*To all whom it may concern:*

Be it known that I, THOMAS H. PHILLIPS, a citizen of the United States, residing at Baltimore, in the State of Maryland, have invented certain new and useful Improvements in Artificial-Breathing Apparatus, of which the following is a specification, reference being had therein to the accompanying drawing.

This invention relates to artificial breathing apparatus, and aims primarily to simplify the construction and operation of devices of this character as well as to increase their efficiency.

A further object of the invention is to provide a breathing apparatus of such improved construction as to introduce and expel the air to and from the lungs of the patient in a manner identical with the natural or normal inhalations and exhalations of those organs.

A still further object of the invention is to provide an apparatus adapted particularly for use in the resuscitation of drowned persons or those overcome by smoke or noxious fumes, and by the use of which the water or fumes may be quickly and entirely removed from the lungs of the person, and a natural inflation and deflation of the breathing organs created to restore life to the body.

A still further object of the invention is to provide a device of the character described, so constructed and arranged as to minimize the danger of overinflation of the lungs, and wherein improved means is employed for indicating to the operator at all times the exact amount of pressure within the breathing organs of the patient.

A still further object of the invention is to provide an improved artificial breathing apparatus employing oxygen or other suitable gas as a vitality restorative, wherein the inhaling and exhaling functions of the apparatus are under the direct and ready control of the operator, whereby the interval between such actions of the device may be increased or decreased according to the condition of the patient, and also embodying means for instantly controlling the flow of oxygen or gas to the lungs.

A still further object of the invention is to provide an improved indicating means whereby the operator of the device may be at all times aware of the condition of the breathing organs of the patient, and to readily detect any natural expansion or contraction of the lungs.

With these objects in view, together with others which will appear as the description proceeds, the invention resides generally in the arrangement of a tank containing air, oxygen or other gas under pressure for introduction to the lungs of the patient, a pipe or tube provided at one end with a suitable nozzle for insertion into the windpipe of the patient and connected at its opposite end with the pressure tank, a pump for creating a suction action upon the breathing organs through the tube, and an improved valve arrangement connected with the pipe or tube and controlled simultaneously with the actions of the pump for properly timing the flow from the tank to the lungs and from the lungs to the pump.

The invention consists further in the arrangement of a tank containing air or gas under pressure with improved means for regulating the flow of air to the tank and for indicating the pressure therein, a tube or pipe for leading the contents of the tank to the breathing organs of a patient and means for accurately determining the quantity of fluid introduced into the lungs, together with improved means for controlling the flow of air and for removing the air from the lungs at the proper time.

The invention further consists in the novel combination and arrangement of parts, and details of construction, all as will be more fully described hereinafter and particularly pointed out in the claims.

The invention will be better understood by reference to the accompanying drawings: wherein—

Figure 2:
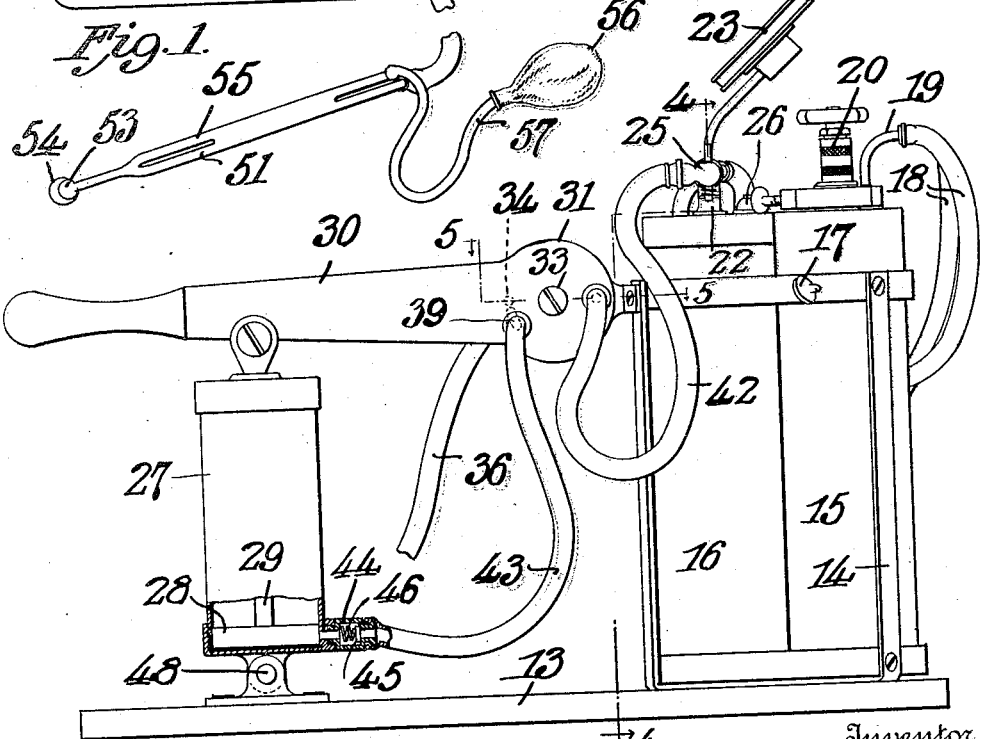
Figure 3:
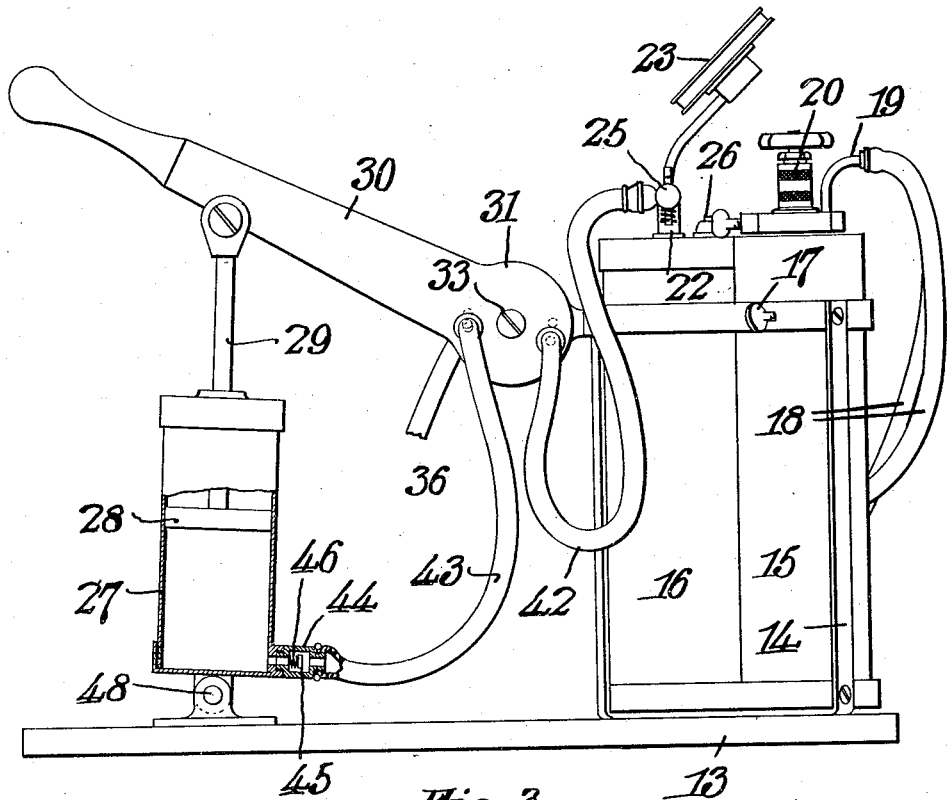
Figure 8:
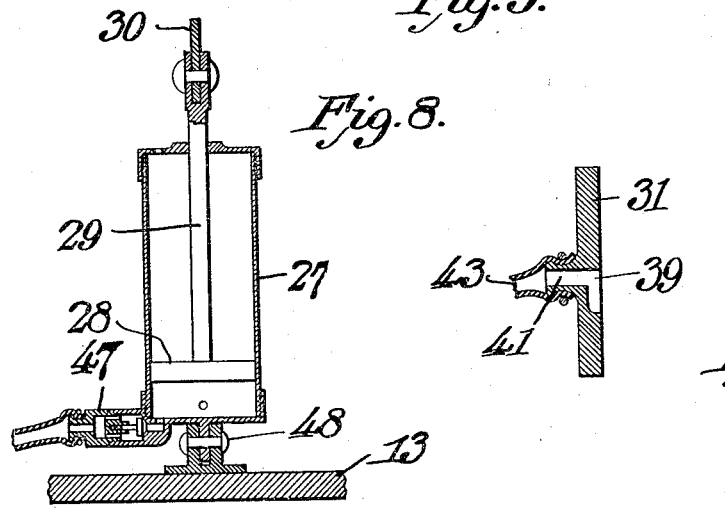
Figure 9:
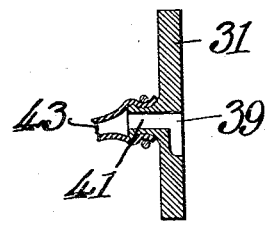

Figure 1 is a top plan view of an artificial breathing apparatus embodying my invention; Fig. 2 is a side elevation, parts in section of the device shown in Fig. 1; Fig. 3 is a view similar to Fig. 2, showing some of the parts in slightly changed position; Fig. 4 is a sectional view taken substantially on the line 4—4 of Fig. 2; Fig. 5 is an enlarged horizontal section taken on line 5—5 of Fig. 2; Fig. 6 is a view taken on line 6—6 of Fig. 5; Fig. 7 is an elevation of the inner face of the head of the pump actuating lever; Fig. 8 is a section through the pump taken on line 8—8 of Fig. 1; Fig. 9 is a section through the head of the pump lever on line 9—9 of Fig. 7; Fig. 10 is a side elevation of the improved device illustrating a slight modification; Fig. 11 is a longitudinal section through the improved nozzle used in carrying out my invention; and Fig. 12 is a sectional view taken on line 12—12 of Fig. 11.

Referring more particularly to the drawings, 13 indicates a suitable base or support upon which the improved mechanism is mounted, and 14 a bracket of approved construction arranged preferably near one end of the base for properly holding air or gas storage bottles or containers 15, and, in the preferred construction, a tank or chamber 16. The bracket may be provided with means, such as thumb screws 17, for securing the bottles and tank securely within the same; the said securing elements permitting of ready manipulation when it is found necessary to remove the bottles or tank. In the preferred construction, the air or oxygen within the bottles 15 is led into the chamber or tank 16 before being delivered to the breathing organs of the patient, in order that the proper pressure may be determined accurately, pipes, preferably in the form of flexible tubing 18, being found most practical for this purpose. The tubes 18 are connected at one end to the stems or nozzles 19 controlled by the usual valves 20 on the bottles 15, and at the other end to the intake pipe 21 on the tank 16, the intake being Y-shaped to permit of a connection with each bottle. The intake pipe communicates with the interior of the tank 16, as shown at 22 in Fig. 4, and a pressure indicator 23 is also in communication with the interior thereof in order that the air or oxygen pressure may be readily determined. This indicator may be of any approved construction, being capable preferably of measuring the pressure by millimeters in order to more minutely measure the air pressure, and is so positioned upon the tank as to be under the constant gaze of the operator. An outlet 24 leads the air or gas from the tank 16 to other parts of the mechanism, and emergency valves 25 may be arranged in the intake and outlet pipes should it be found necessary to shut off the air to or from the tank 16. The tank 16 may also be provided with an approved exhaust or safety valve as indicated at 26, preferably one capable of minute adjustment in order that it may be set to operate at various predetermined pressures.

A pump 27 is located near the opposite end of the base or support 13, the same for the present purposes being of the reciprocating piston type, the piston 28 thereof being connected by the piston rod 29 to an operating handle or lever 30. One end of the handle or lever 30 is provided with a head 31 adapted during the reciprocating movements of the pump piston to slide over a plate 32 fixedly secured to the bracket 14 or other suitable support. To this end, the head 31 may be pivoted as shown at 33 to the plate 32, the adjacent faces of the said plate and head being snugly fitted together to permit of the sliding or rotary movement of the head, and at the same time to provide an air tight joint between the said adjacent faces. The plate 32 is provided with a pair of ports 34 and 35, each being spaced equidistant from the pivot 33 at points diametrically opposite to be concentric with said pivot. Communicating with both of said ports from the exterior or opposite side of said plate is a flexible tube or pipe 36, the connection being effectuated by a Y-shaped pipe 37 on the end of the said tube 36. The head 31 is provided also with a pair of spaced ports 38 and 39, each being positioned from the pivot 33 a distance equal to the distance which the ports 34 and 35 of the plate 32 are spaced in order that upon sliding movement of the lever head 31, the said ports will be brought into alinement or registration with each other. The port 39 is preferably elongated, as is shown in Fig. 7, the upper edge of the same being disposed substantially below or out of axial alinement with the lowermost edge of the port 38 in order that when properly assembled upon the plate 32, the ports 38 and 39 of the head 31 will be in communication only one at a time with the coöperating ports of the plate 32. Nipples 40 and 41 are provided on the outer or exterior face of the head 31 and communicate with the ports 38 and 39 of the latter respectively to form a convenient connecting means for tubes or pipes 42 and 43 leading from the tank 16 and pump 27 respectively. The elongated port 39 is so positioned upon the head 31 that when the lever 30 is in its lowermost position, or at the termination of the compression stroke of the pump, communication with its coöperating port 34 in the plate 32 will be cut off, while the port 38 will be in registration with its coöperating port 35 of plate 32 thereby permitting a flow of gas or air from the tank 16 to the pipe or tube 36. Upon upward or suction stroke of the pump 27, the head 31 turning on its pivot 33 will cause the port 38 to move out of registration or alinement with the port 35, thereby cutting off the oxygen or gas supply from the tank 16, while the elongated slot 39 will communicate with the port 34, and by reason of the partial vacuum created in the pump chamber 27 by the piston therein, a sucking action will be established in the pipe or tube 36. It is also to be observed that by reason of the elongated port 39, this suction continues throughout practically the entire upward or suction stroke of the pump.

A conventional check valve 44 is provided in the pump 27, to which the tube or pipe 43 leads, and it is apparent that the vacuum created in the pump chamber by outward movement of the piston 28 will cause the flap 45 of said valve to unseat against the tension of the spring 46, as is clearly shown in Fig. 3, to effectuate the proper suction action in pipe 36, while movement of the piston in the opposite direction allows the valve flap to be seated to prevent egress of fluid through pipe 43. The pump 27 is also provided with an exhaust valve, as indicated generally at 47 in Fig. 8 of the drawings. This valve, like the valve 44, may be of conventional form, and operates to exhaust fluid from the pump casing upon the compression stroke of the piston 28, being tightly seated upon outward movement of the said piston.

The pump 27 may be pivoted, as shown at 48, to the support 13 to compensate for the rocking movement necessarily imparted to it during the reciprocations of the pump operating handle 30.

In Fig. 10 of the drawings I have shown a slightly modified form of the device thus far described, in which I dispense with the tank or chamber 16 and the mechanism immediately connected therewith, and substitute a pressure bag 49; the same being connected as at 50 at one end with the bottles or oxygen containers 15, and at the other end to the nipple 40 on the head 31. This bag may be constructed of any preferred material, thin rubber being found most efficient for the purpose, and it is obvious that upon opening the valve 20 in the bottle 15 the contents of the latter will flow into the bag 49, and from there, upon actuation of the lever 30, into the pipe or tube 36. As the lever 30 is actuated the opening and closing of the port 35 will create fluctuations in the bag 49, and the operator may be governed by the movements of the bag in the administration of the oxygen or gas, and the amount of pressure delivered to the breathing organs of the patient is obviously reduced by the use of the bag 49, thereby minimizing the danger due to overinflation of the lungs. These bags may be made of a standard size or of various sizes according to the varied lung capacities of different persons.

The improved nozzle for connecting the pipe 36 with the lungs of the patient is illustrated in detail in Figs. 11 and 12, wherein 51 indicates a pipe, preferably of metal or other rigid substance, connected at one end as at 52 with the pipe 36, and at its opposite end with a tube 53 for insertion within the windpipe of a patient. The tube is preferably secured to the pipe 52 to extend therefrom at right angles in order that the same may be conveniently passed through the mouth to be inserted within the windpipe, a shoulder 54 being formed upon the tube 53 inwardly from the free end thereof to fit within the walls of the windpipe to preclude the entrance or exit of fluid to and from the lungs except through the nozzle. A pipe 55 communicates with the pipe 51, the two pipes being disposed preferably parallel to each other and close together throughout the major portion of their length to form a suitable gripping surface for the hands of the operator, and an indicator 56 is arranged in connection with the outer or free end of the pipe 55. This indicator may be of any approved design, a most practical means for determining the condition of the lungs of the patient being found in the employment of a bag of thin rubber, communicating with the pipe 55 by means of a flexible tube 57, as shown.

In operation, the nozzle above described is inserted properly within the windpipe of the patient. If it be desired to empty the lungs before the introduction of oxygen, as in case of a drowned person, or one overcome by smoke or fumes, a few reciprocations of the pump will be necessary, after which the valve 20 in the oxygen or gas bottle may be opened to admit the fluid contained therein to the tank 16. The amount of fluid admitted will, of course, depend upon condition of the patient, the size or capacity of the lungs being also taken into consideration, and the fluid introduced into the tank 16 is accurately measured by the indicator 23 which is constantly watched by the pump operator. As the lungs are inflated and deflated by action of the pump and air pressure, the indicator 56 which is held in the hand, is correspondingly inflated and deflated, thus indicating to the operator the exact condition of the lungs. The breathing action may be quickened when necessary by more rapid reciprocations of the pump. When muscular contraction of the lungs occurs, due to the revival of the patient, the same will be indicated by the bag 56 held by the operator, whereupon the nozzle may be withdrawn and a cone of any approved construction attached to the free end of the tube 36 to cover the mouth and nose of the patient. The flow of oxygen, as well as the pump reciprocations, may then be varied accordingly. It is apparent that the location of the apertures or ports in the sliding head 31 will cause, upon a proper manipulation of the pump, a natural breathing operation.

While in this description I have referred to the device in its most simple and practical form, it is apparent that the same is susceptible of various changes and alterations in the various details of construction and arrangement of parts, and I reserve to myself the right to make such changes as may be found expedient without departing from the spirit of the invention.

I claim:

1. In an artificial breathing apparatus, the combination with a source of air supply and a pump, a pipe connected to said air source and said pump, means for actuating said pump, and means governed by said actuating means for establishing communication between said pipe and said air source and pump alternately, such communication being established and maintained only when said actuating means is at the limits of its strokes, substantially as described.

2. In an artificial breathing apparatus, the combination with a source of air supply and a pump, a pipe, a connection between said air source and said pipe and said pump and said pipe, means for actuating said pump, and means governed by said actuating means for establishing communication between said pipe and said air source and pump alternately, such communication being established and maintained only when said actuating means is at the limits of its strokes, substantially as described.

3. In an artificial breathing apparatus, the combination with a source of air supply and a pump, a pipe, a connection between said air source and said pipe and said pump and said pipe, means for actuating said pump, and means governed by the movement of said actuating means in one direction for establishing communication between said pipe and said pump, and when in its extreme opposite position for establishing communication between said air source and said pipe, substantially as described.

4. In an artificial breathing apparatus, the combination with a source of air supply and a reciprocating pump, a pipe, a connection between said pipe and said air source and said pipe and said pump, and means operating simultaneously for establishing and breaking communication alternately between said air source and pump and said pipe, such communication being established and maintained only when said means is at the limits of its strokes, substantially as described.

5. In an artificial breathing apparatus, the combination with a source of air supply and a reciprocating pump, a pipe, a connection between said pipe and said air source and said pipe and said pump, means for establishing communication between said pump and said pipe on the suction stroke of said pump, and for breaking said connection and establishing communication between said air source and said pipe at the limit of the compression stroke of said pump, substantially as described.

6. In an artificial breathing apparatus, the combination with a source of air supply and a pump, a lever for actuating said pump, the said lever being provided with a pair of valves, a connection between one of said valves and said air source and between the other of said valves and said pump, a pipe, a connection between said pipe and each of said valves, and means governed by the movements of said lever for alternately opening said valves, substantially as described.

7. In an artificial breathing apparatus, a source of air supply and a pump, a plate provided with a pair of ports, a pipe, a connection between said pipe and each of said ports, a pump actuating lever mounted to slide upon said plate in its pump actuating movements, the said lever being provided with a pair of ports adapted to register with the ports in said plate alternately during said movements, and a connection between one of the ports in said lever and said pump and the other of said ports and said air source, substantially as described.

8. In an artificial breathing apparatus, a source of air supply and a pump, a plate provided with a pair of spaced ports, a pipe, a connection between said pipe and each of said ports, a lever for actuating said pump pivoted to slide upon said plate, the said lever being provided with a pair of spaced ports adapted to register alternately with the ports in said plate during the pump actuating movements, and a connection between one of the ports in said lever and said pump and the other of said ports and said air supply, substantially as described.

9. In an artificial breathing apparatus, a source of air supply and a pump, a plate provided with a pair of ports, a pipe, a connection between said pipe and each of said ports, a pump actuating lever having a head pivoted to said plate and being provided with a pair of ports adapted to register with the ports in said plate, the ports in said plate and head being concentric with said pivot, one of the ports in said head being elongated and terminating at one end in a plane slightly beyond that of the adjacent edge of the opposite port in said head, and a connection between said elongated port and said pump and the other of said ports and said air source, substantially as described.

10. An artificial breathing apparatus comprising a source of air under pressure and a pump, said pump having an intake and an exhaust valve, a pipe, a connection between said air source and said pipe and said intake valve and said pipe, a control valve in said pipe, and means operating automatically upon the suction movement of said pump for actuating said control valve for establishing communication between said intake valve and said pipe, and for severing communication between said air source and said pipe, substantially as described.

11. In an artificial breathing apparatus, a pipe, means for forcing fluid through said pipe in both directions, a nozzle on one end of said pipe, and an expansible bag communicating with said nozzle, substantially as described.

12. In an artificial breathing apparatus, a pipe, means for forcing fluid through said pipe in both directions, a nozzle on one end of said pipe, said nozzle having an offset pipe communicating with the channel thereof, an indicator comprising a flexible bag, and a connection between said bag and said offset pipe, substantially as described.

13. An artificial breathing apparatus comprising a source of air under pressure and a pump, means for operating said pump, a sliding member connected to said means, a pipe, a connection between said air source and said member and said pump and said member, and means governed by the movements of said sliding member for establishing and breaking alternately a connection between said air source and pump respectively with said pipe, substantially as described.

14. In an artificial breathing apparatus, a pipe provided at one end with means for insertion within the wind pipe of a person, means for forcing air in opposite directions through said pipe, a plate, a connection between said pipe and said plate, a head mounted for sliding movement on said plate, and connections between said head and said air forcing means whereby the movements of the former will govern the direction of air through said pipe, substantially as described.

15. In an artificial breathing apparatus, the combination of a source of air under pressure and a pump, means for operating said pump, a plate, a head arranged to slide upon said plate, a connection between said head and said pump operating means, said head and plate being provided with spaced ports adapted to register alternately with the movements of said head, a pipe, a connection between said pipe and each of the ports in said plate, a connection between one of the ports in said head and said air source, and between the other of said ports and said pump, substantially as described.

16. In an artificial breathing apparatus, a source of air supply and a pump, a pipe, a fixed and a movable member each provided with spaced ports adapted to register alternately upon movements of said movable member, a connection between certain of said ports and said pipe, a connection between one of said ports and said pump, and a connection between one of said ports and said air source, substantially as described.

17. In an artificial breathing apparatus, a container for air under pressure, a plate having a pair of ports, a pipe connected to each of said ports, a head provided with a pair of ports adapted to slide over said plate to register its ports with those of said plate alternately when in certain positions, a connection between one of the ports of said head and said container, a pump, means for actuating said pump, said means being connected to said head to actuate same and a connection between the other of said ports in said head and said pump, substantially as described.

18. In an artificial breathing apparatus, a pipe, means for forcing fluid through said pipe, a nozzle, said nozzle comprising a pair of parallelly arranged branch pipes communicating at one end and being separated and open at their opposite ends, said pipe being connected to one of said branch pipes and an indicator connected to the open end of the other of said branch pipes, substantially as described.

19. In an artificial breathing apparatus, a tank containing fluid under pressure, a pump, a lever for actuating said pump, a pair of valves in connection with said lever, a connection between one of said valves and said tank and the other of said valves and said pump, a pipe, a connection between each of said valves and said pipe, and means governed by the movements of said lever for alternately opening said valves, substantially as described.

20. In an artificial breathing apparatus, a tank containing fluid under pressure, a pump, a lever for operating said pump, a plate provided with a pair of spaced ports, a head provided with a pair of spaced ports connected to said lever and adapted to slide over said plate to register its ports alternately with those of said plate, a connection between one of the ports of said head and said tank, and a connection between the other of said ports and said pump, and a pipe communicating with both of the ports of said plate, substantially as described.

In testimony whereof, I affix my signature, in presence of two witnesses.

THOMAS H. PHILLIPS.

Witnesses:
HARRY N. ARMACOST,
ELEANOR M. HESS.

Copies of this patent may be obtained for five cents each, by addressing the "Commissioner of Patents, Washington, D. C."